(12) United States Patent
Marumoto

(10) Patent No.: US 7,756,448 B2
(45) Date of Patent: Jul. 13, 2010

(54) TRACTION-DRIVE TYPE DRIVING-FORCE TRANSMISSION MECHANISM AND IMAGE FORMING APPARATUS EQUIPPED THEREWITH

(75) Inventor: Takeshi Marumoto, Osaka (JP)

(73) Assignee: Kyocera Mita Corporation (JP)

( * ) Notice: Subject to any disclaimer, the term of this patent is extended or adjusted under 35 U.S.C. 154(b) by 226 days.

(21) Appl. No.: 12/145,872

(22) Filed: Jun. 25, 2008

(65) Prior Publication Data

US 2009/0003880 A1    Jan. 1, 2009

(30) Foreign Application Priority Data

| Jun. 27, 2007 | (JP) | ............................... 2007-168403 |
| Nov. 13, 2007 | (JP) | ............................... 2007-294296 |
| Nov. 13, 2007 | (JP) | ............................... 2007-294298 |
| Nov. 13, 2007 | (JP) | ............................... 2007-294299 |
| Nov. 13, 2007 | (JP) | ............................... 2007-294300 |
| Nov. 13, 2007 | (JP) | ............................... 2007-294301 |

(51) Int. Cl.
- *G03G 15/00* (2006.01)
- *G03G 15/16* (2006.01)
- *F16H 13/06* (2006.01)
- *F16H 13/14* (2006.01)

(52) U.S. Cl. ..................... 399/167; 399/308; 475/183; 475/195

(58) Field of Classification Search ................. 399/167, 399/302, 308; 475/183, 195, 197
See application file for complete search history.

(56) References Cited

U.S. PATENT DOCUMENTS

| 4,747,324 A | 5/1988 | Perry |
| 5,025,671 A | 6/1991 | Kraus |
| 6,420,807 B1 * | 7/2002 | Tsujimoto et al. ........ 399/167 X |

FOREIGN PATENT DOCUMENTS

| EP | 0 231 990 | 8/1987 |
| FR | 2 481 772 | 11/1981 |
| JP | 9-42404 | 2/1997 |
| JP | 2000-329206 | 11/2000 |

* cited by examiner

*Primary Examiner*—Sandra L Brase
(74) *Attorney, Agent, or Firm*—Gerald E. Hespos; Michael J. Porco

(57) ABSTRACT

A traction-drive force transmission mechanism, includes a sun roller rotatable about a first axis and a plurality of shafts. Each is disposed on an adjacent axis inclined relative to the first axis. Planetary rollers are disposed along an outer peripheral surface of the sun roller and are supported respectively by the shaft. A carrier holds each of the shafts in the inclined posture and is adapted to be rotated about the first axis together with the planetary rollers. A pressing member pressingly moves each planetary roller in a direction for reducing a distance to the first axis so as to press each planetary roller against the outer peripheral surface of the sun roller. Thus a driving force can be transmitted to a traction force between the sun roller and each of the planetary rollers.

14 Claims, 12 Drawing Sheets

TRACTION-DRIVE TYPE DRIVING-FORCE TRANSMISSION MECHANISM AND IMAGE FORMING APPARATUS EQUIPPED THEREWITH

BACKGROUND OF THE INVENTION

1. Field of the Invention

The present invention relates to a traction-drive type driving-force transmission mechanism capable of transmitting a driving force or reducing a rotational speed, through means of a traction force generated between rollers, and an image forming apparatus equipped with the traction-drive type driving-force transmission mechanism.

2. Description of the Related Art

As a conventional technique relating to traction-drive type driving-force transmission mechanisms, there has been known a mechanism which comprises a sun roller coupled to a rotary shaft, a plurality of planetary rollers arranged around the sun roller, and a carrier supporting respective planetary shafts of the planetary rollers (see, for example, JP 2000-329206A, which will hereinafter be refereed to as "D1"). The mechanism disclosed in the D1 is designed such that each of the planetary rollers is rotated through means of a traction force generated between the sun roller and each of the planetary rollers, and a movement of each of the planetary rollers orbited around the sun roller along a pair of orbit rings is transmitted from the carrier to an output shaft.

In order to generate a sufficient traction force between the sun roller and each of the planetary rollers, it is necessary to strongly press the planetary roller against the sun roller (i.e., bring the planetary roller into press contact with the sun roller) in the presence of a lubricant while rotatably supporting the planetary roller by the corresponding planetary shaft. For this purpose, in the mechanism disclosed in the D1, the planetary shaft and the planetary roller are formed and arranged to ensure a certain gap therebetween, and the pair of orbit rings each having an inclined surface formed in an inner periphery thereof is disposed to sandwich therebetween two inclined portions formed on respective axially opposite lateral sides of the planetary roller, wherein each of the orbit rings is adapted to bring the inclined surface thereof into press contact with an inclined surface formed in an outer periphery of an associated one of the inclined portions so as to press the planetary roller against an outer peripheral surface of the sun roller.

In the mechanism disclosed in the D1, each of the planetary rollers is adapted to be freely displaceable relative to the planetary shaft within the range of the gap, although the planetary shaft is fixed to the carrier. Thus, when the orbit rings are brought into press contact with the respective inclined surfaces of the planetary rollers, the planetary rollers will be strongly pressed against the sun roller, so that a required traction force can be generated in the presence of a lubricant.

In the mechanism disclosed in the D1, it is necessary to use the two orbit rings made of a costly material, such as tool steel, and the resulting increase in material cost will lead directly to an increase in product cost. Moreover, an increase in the number of components requiring high-accuracy assembling, such as the orbit rings, will accelerate complexity of the assembling process to lead a problem about an increase in production cost.

Moreover, in the mechanism disclosed in the D1, the planetary shaft and the planetary roller are arranged to define a gap therebetween. This arrangement involves a possibility that a rotation axis (rotation central axis) of the planetary roller is displaced at a certain amount of angle with an axis (central axis) of the planetary shaft. Thus, when the planetary roller is pressed against the sun roller, an outer peripheral surface of the planetary roller is likely to be slightly inclined relative to the outer peripheral surface of the sun roller. In this case, a pressure distribution on the outer peripheral surface of the planetary roller becomes uneven in an axial direction of the planetary roller, and thereby so-called "edge contact" occurs to cause uneven wear (i.e., partial or local wear) on the outer peripheral surface of the sun roller.

SUMMARY OF THE INVENTION

It is an object of the present invention to provide a technique capable of generating an axially even traction force between the planetary roller and the sun roller without an increase in the number of components.

In order to achieve this object, according to one aspect of the present invention, there is provided a traction-drive type driving-force transmission mechanism which comprises: a sun roller having a first central axis, wherein the sun roller is rotatable about the first central axis; a plurality of shaft members each having a second central axis, wherein each of the shaft members is disposed on an adjacent axis inclined relative to the first central axis by a given angle, in such a manner that the second central axis is aligned with the adjacent axis; a plurality of planetary rollers disposed along an outer peripheral surface of the sun roller while being supported by respective ones of the shaft members; a carrier which holds each of the shaft members in the inclined posture, wherein the carrier is adapted to be rotated about the first central axis together with the planetary rollers; and a pressing member adapted to pressingly move each of the planetary rollers in a direction for reducing a distance with respect to the first central axis when viewed on the adjacent axis, so as to press each of the planetary rollers against the outer peripheral surface of the sun roller to allow a driving force to be transmitted through means of a traction force between the sun roller and each of the planetary rollers.

According to another aspect of the present invention, there is provided an image forming apparatus which comprises: an image forming section including at least a photosensitive drum, or a photosensitive drum and an intermediate transfer belt; a driving source operable to generate a driving force for driving the photosensitive drum, or at least one of the photosensitive drum and the intermediate transfer belt; and a traction-drive type driving-force transmission mechanism operable to transmit the driving force of the driving source to a rotary shaft of the photosensitive drum, or a driving member of the intermediate transfer belt, wherein the traction-drive type driving-force transmission mechanism has the above feature.

DETAILED DESCRIPTION OF THE PREFERRED EMBODIMENTS

With reference to the drawings, the present invention will now be specifically described based on an embodiment thereof.

Figure 1A:
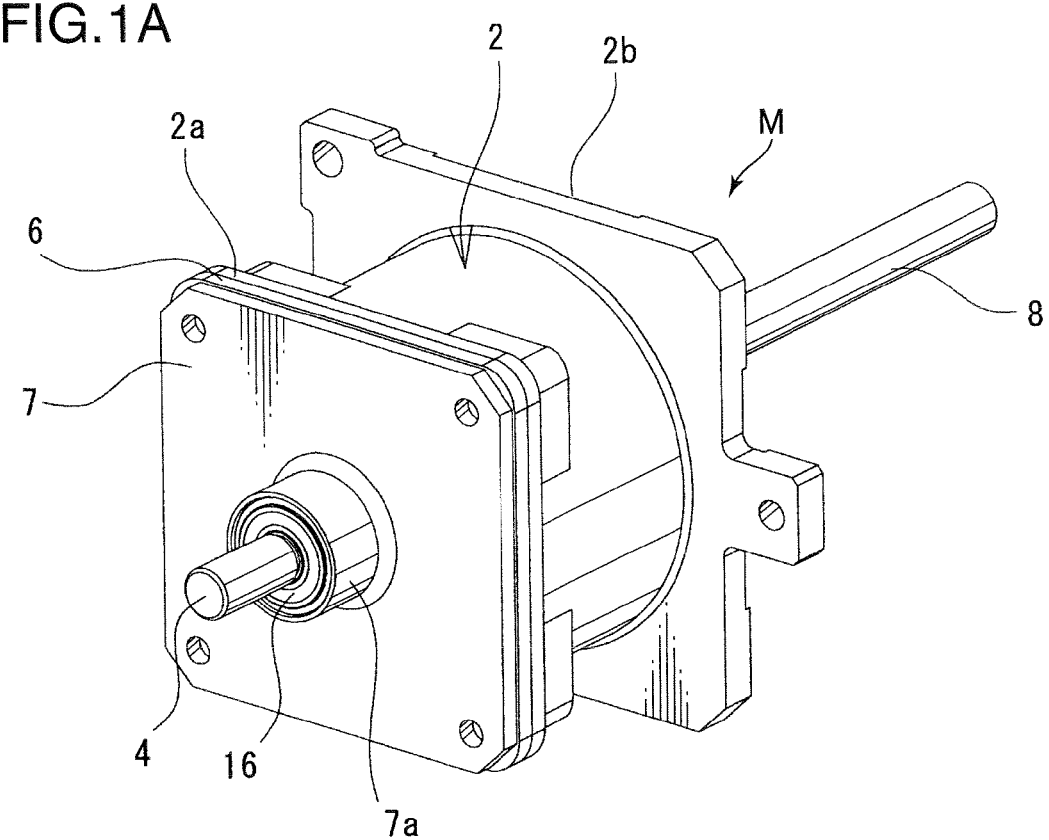
FIGS. 1A and 1B are perspective views showing an external appearance of a traction-drive type driving-force transmission mechanism according to one embodiment of the present invention, when viewed from two different directions.
Figure 1B:
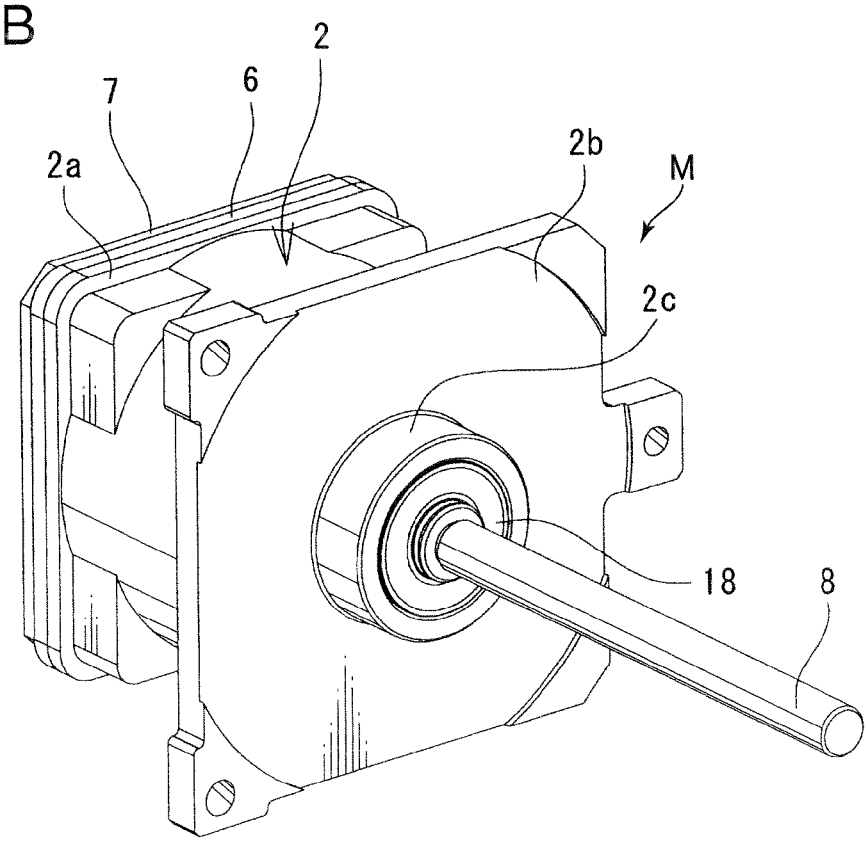

FIGS. 1A and 1B are perspective views showing an external appearance of a traction-drive type driving-force transmission mechanism M according to one embodiment of the present invention, when viewed from two different directions. The traction-drive type driving-force transmission mechanism M includes a cylindrical-shaped casing 2, a sun roller 4, an end plate 6, a bearing plate 7, and an output shaft 8.

The casing 2 has a rectangular-shaped flange 2a formed at one end thereof, and the flange 2a is formed with an opening which is closed by the end plate 6 having a shape corresponding to that of the flange 2a. The casing 2 further has a rectangular-shaped flange 2b formed at the other end on an opposite side of the flange 2a. The traction-drive type driving-force transmission mechanism M is adapted to be connected to a driving source, such as a motor (not shown), disposed on the side of the flange 2a.

As shown in FIG. 1A, one end (i.e., distal end) of the sun roller 4 serving as a driving-force input shaft is received inside the casing 2, and the output shaft 8 is disposed to protrude from the inside of the casing 2 and extend in an opposite direction of the sun roller 4. The bearing plate 7 is attached to the end plate 6, and formed with a boss portion 7a in a central region thereof. The boss portion 7a is internally provided with two bearings 16 (see FIG. 7; only one of them is shown in FIG. 1A), and the sun roller 4 is supported by the bearing plate 7 (casing 2) through the two bearings 16. The casing 2 is internally filled with a lubricant (e.g., grease), and the bearings 16 are adapted to seal the grease filling the inside of the casing 2, while rotatably supporting the sun roller 4.

Figure 7:
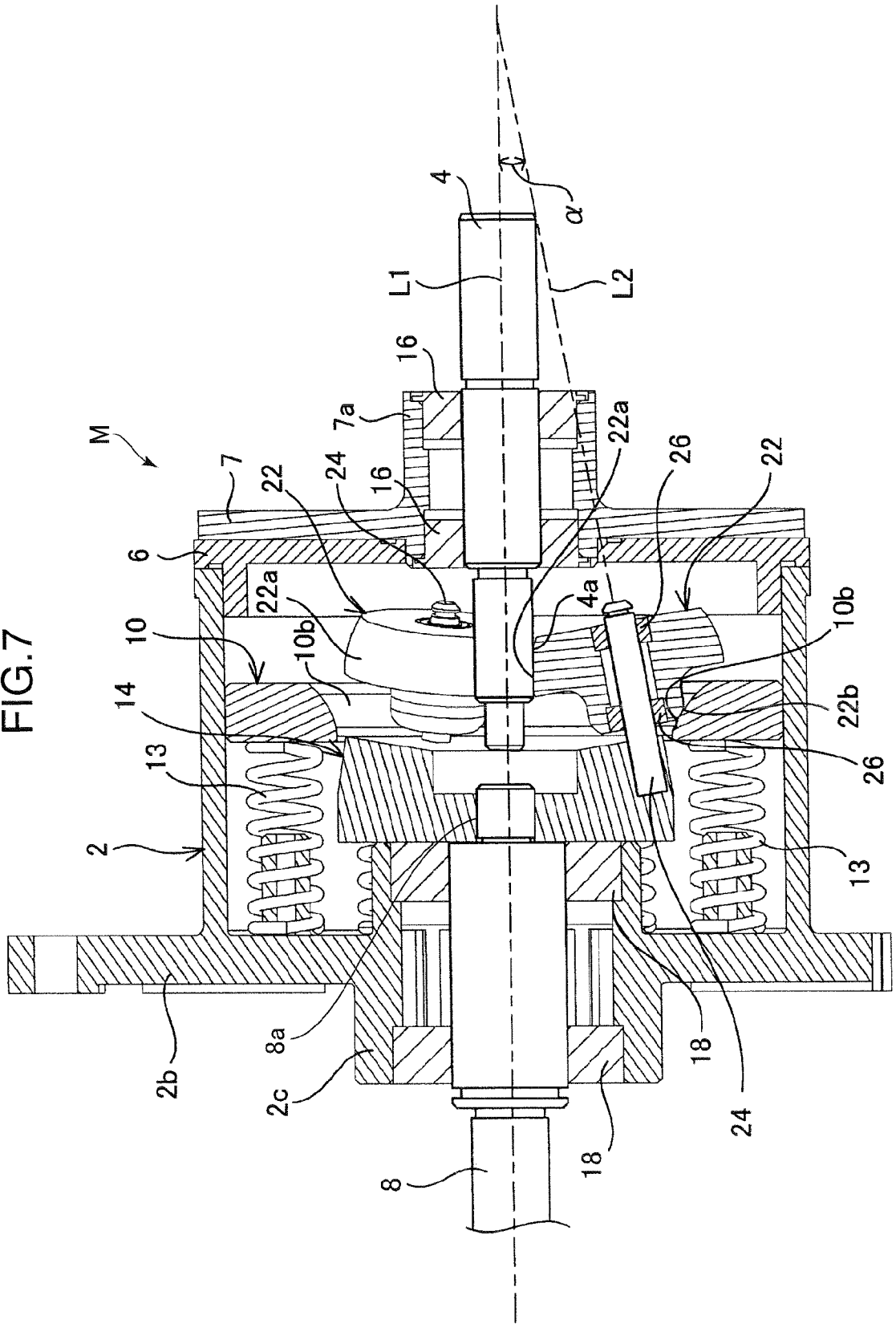
FIG. 7 is a vertical sectional view showing the traction-drive type driving-force transmission mechanism, taken along an axial direction thereof.

As shown in FIG. 1B, the flange 2b also has a boss portion 2c which is formed in a central region thereof and internally provided with two bearings 18 (see FIG. 7; only one of them is shown in FIG. 1B). The output shaft 8 is supported by the flange 2b (casing 2) through the two bearings 18. The bearings 18 are adapted to seal the grease filling the inside of the casing 2, while rotatably supporting the output shaft 8, in the same manner as that in the bearings 16.

Figure 2:
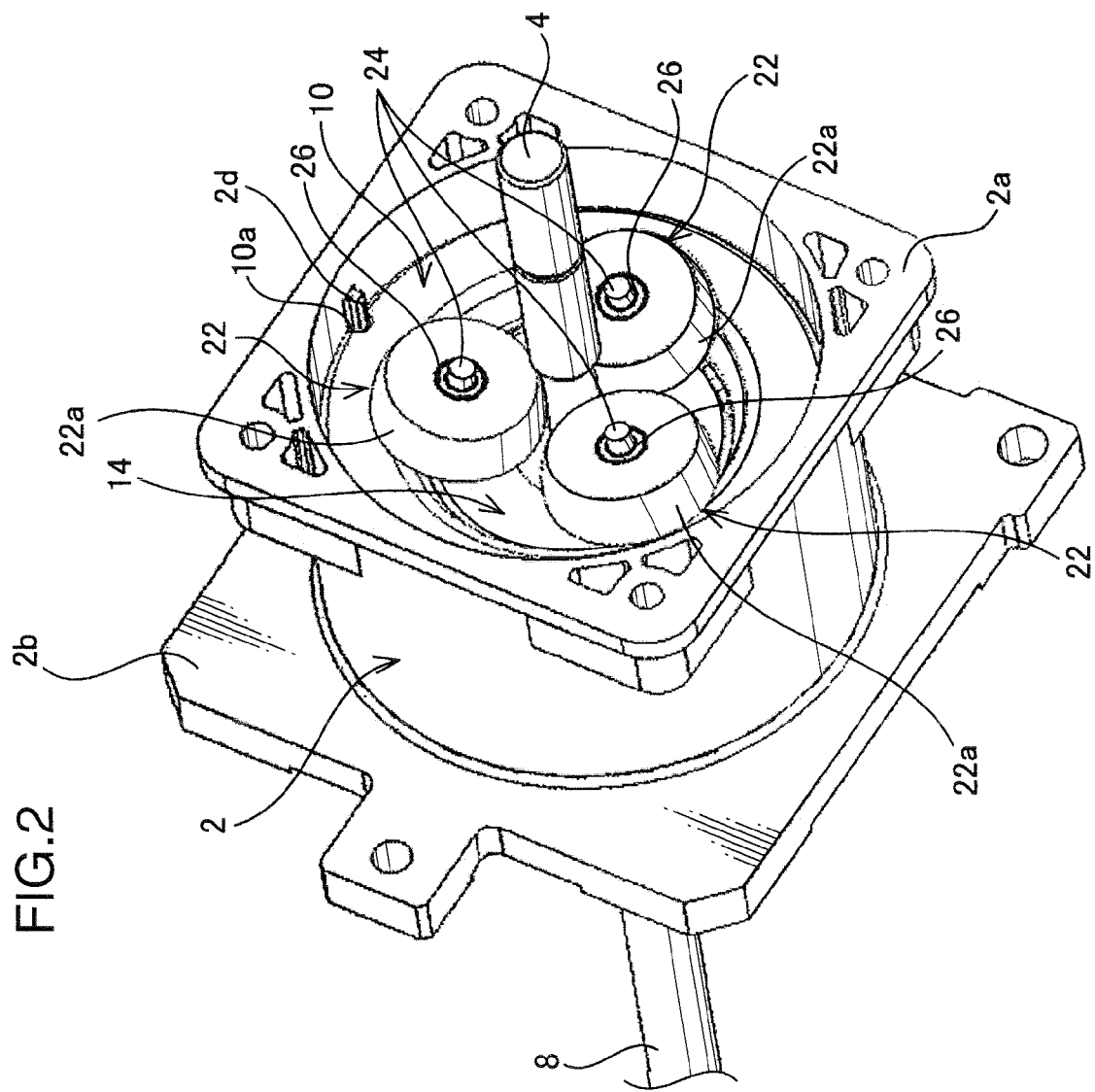
FIG. 2 is a perspective view partly showing an internal structure of the traction-drive type driving-force transmission mechanism.

FIG. 2 is a perspective view partly showing an internal structure of the traction-drive type driving-force transmission mechanism M. For convenience of explanation, FIG. 2 is illustrated in a state after the end plate 6 and the bearing plate 7 are detached from the casing 2. The casing 2 receives therein a part of the sun roller 4, and three planetary gears 22 disposed along an outer peripheral surface of the sun roller 4. Each of the planetary rollers 22 is rotatably supported relative to a respective one of three shaft members 24 through a respective one of three bearings 26.

The casing 2 further receives therein a planetary carrier 14 (serving as a carrier) which is disposed at a position on a back side (on the side of the output shaft 8) relative to the planetary roller 22, when viewed from the angle as shown in FIG. 2. Each of the shaft members 24 is fixedly supported by the planetary carrier 14 in such a manner that an anchor end thereof is press-fitted into the planetary carrier 14. The output shaft 8 is connected to the planetary carrier 14 (see FIG. 7). That is, the planetary carrier 14 supporting the shaft members 24 is adapted to be rotated in conjunction with a planetary movement of the group of three planetary rollers 22 (i.e., an orbital movement of the group of three planetary rollers 22 around the outer peripheral surface of the sun roller 4). A rotary force is picked up from the output shaft 8.

As for the output shaft 8, the planetary carrier 14 and the output shaft 8 are composed, respectively, of separate components, and screwingly connected to each other. Specifically, as shown in FIG. 7, the output shaft 8 has a screw portion 8a screwable into a screw hole 8 formed in a central region of the planetary carrier 14. The screw portion 8a has an external thread adapted to be tightened in a direction of a torque to be received by the output shaft 8.

This two-component structure makes it possible to simplify a machining process and facilitate assembling/disassembling of the planetary carrier 14 and the output shaft 8, as compared with a single-component structure where the planetary carrier 14 and the output shaft 8 are integrally formed as a single piece. In addition, the output shaft 8 is screwed with the planetary carrier 14 in a direction for tightening in a driven state thereof. Thus, as long as the output shaft 8 is screwed with the planetary carrier 14 with an adequate tightening torque during assembling, any rotational fluctuation (driving delay) due to defective tightening will not occur in a rotation direction of the output shaft 8 even for a moment, during actual use. This makes it possible to reliably maintain the connection between the planetary carrier 14 and the output shaft 8.

Additionally, the casing 2 receives therein a single outer ring 10 (serving as a pressing member), and a plurality of compression coil springs 13 (see FIG. 7; none of them is shown in FIG. 2). The outer ring 10 is designed to pressingly move each of the planetary rollers 22 by a repulsion force of the compression coil springs 13, so as to press an outer peripheral surface 22a of the planetary roller 22 against the outer peripheral surface of the sun roller 4. The outer ring 10 and the compression coil springs 13 will be more specifically described later with reference to other figures.

The outer ring 10 has an outer diameter slightly less than an inner diameter of the casing 2. This dimensional relationship is set to allow the outer ring 10 to be fitted in the casing 2 highly accurately with a small gap therebetween. The casing 2 has a two line-shaped protrusions 2d (only one of them is shown in FIG. 2) formed on an inner surface thereof. Each of the line-shaped protrusions 2d is formed to extend in parallel relation to respective central axes of the sun roller 4 and the output shaft 8. The outer ring 10 is formed with two grooves 10a correspondingly to respective ones of the two line-shaped protrusions 2d. Thus, when the outer ring 10 is fitted in the casing 2, the line-shaped protrusions 2d are received in the respective grooves 10a. This allows the outer ring 10 fitted in the casing 2 to be restricted in displacement in a rotation direction (i.e. about the sun roller 4 and the output shaft 8).

Preferably, each of the three components consisting of the sun roller 4, the planetary roller 22 and the outer ring 10 is made of a material having a relatively high hardness, particularly, a material having a hardness equal to or greater than that of die steel. For example, the sun roller 4 may be made of a material prepared by subjecting a raw material based on SKH (i.e., one type of high-speed steel) defined by JIS G4403 to a quenching/tempering treatment at an appropriate temperature. The planetary roller 22 may be made of a material prepared by subjecting a raw material based on SKD (i.e., one type of alloy tool steel) defined by JIS G4404 to a quenching treatment at an appropriate temperature. The outer ring 10 may be made of NAK (i.e., pre-hardened steel which is one type of die steel) (trade name of a material for a plastic molding die, produced by Daido Steel Co., Ltd.), directly without subjecting it to a quenching treatment.

More specifically, the sun roller 4, the planetary roller 22 and the outer ring 10 may be made, respectively, of SKH 51, SKD 11 and NAK 55 (trade name, produced by Daido Steel Co., Ltd.). The SKH 51 for the sun roller 4, the SKD 11 for the planetary roller 22, and the NAK 55 for the outer ring 10, have micro-Vickers hardnesses Hv of about 700, about 520 and about 450, respectively.

In this embodiment, each of the three components consisting of the sun roller 4, the planetary roller 22 and the outer ring 10 is made of a material having a hardness set to become higher in descending order of surface velocity in respective press contact portions of the three components. Specifically, each of the sun roller 4, the planetary roller 22 and the outer ring 10 is made of a material having a hardness set to become higher in this order. In this case, as compared with a case where each of the three components is made of the same material, a lifetime capable of satisfying a target wow and flutter value can be extended about three times, under the same load condition. This makes it possible to retard performance deterioration due to seizing or wearing, and provide enhanced wear resistance.

Preferably, at least one of the three components consisting of the sun roller 4, the planetary roller 22 and the outer ring 10, which is to be driven at a maximum value of surface velocity in respective press contact portions thereof, more specifically the sun roller 4, has a surface subjected to a micro-shot peening treatment (WPC treatment). This treatment includes bringing ceramic or glass particles having a diameter of about 10 μm (1 μm=1×10$^{-6}$ m) into collision with the surface of the component at sonic speed. This makes it possible to provide enhanced wear resistance to the sun roller 4.

In the sun roller 4 subjected to the micro-shot peening treatment, as compared with a sun roller which is not subjected to this treatment, a lifetime capable of satisfying a target wow and flutter value can be extended about 1.5 times, under the same load condition. This makes it possible to extend a lifetime of the traction-drive type driving-force transmission mechanism M.

Figure 3:
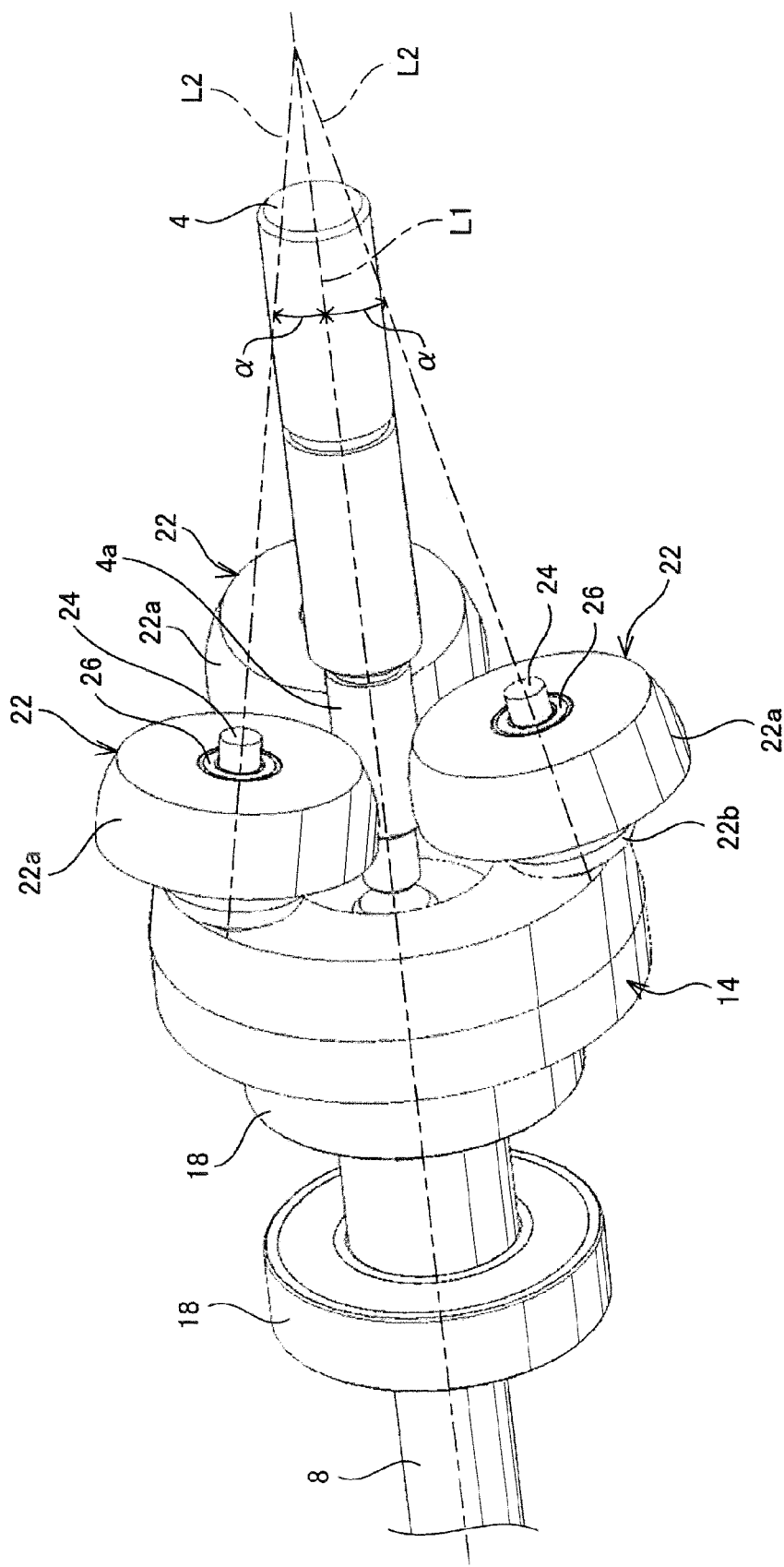
FIG. 3 is a perspective view showing an arrangement of three planetary rollers relative to a sun roller, wherein an outer ring is detached therefrom.

FIG. 3 is a perspective view showing an arrangement of the three planetary rollers 22 relative to the sun roller 4, wherein the outer ring 10 is detached therefrom. Each of the three planetary rollers 22 is disposed on a respective one of three adjacent axes L2 each inclined relative to a rotation axis L1 (serving as a first center axis) of the sun roller 4 by a given angle α, and at even intervals (i.e., at intervals of 120°) in a circumferential direction of the sun roller 4. That is, the three planetary rollers 22 are disposed around the sun roller 4 in such a manner that a central axis (serving as a second central axis) of each of the shaft members 24 supporting the planetary rollers 22 (i.e., a rotation axis of each of the planetary rollers 22) is aligned with a corresponding one of the three adjacent axes L2.

For example, the inclination angle α of the rotation axis (adjacent axis L2) of the shaft member 24 for each of the planetary rollers 22, relative to the rotation axis L1 of the sun roller 4, is set at about 10°. Further, the three adjacent axes L2 are arranged to intersect with each other at a single common point on the rotation axis L1 of the sun roller 4, in such a manner as to allow all the shaft members 24 to be disposed on respective ones thereof. The planetary carrier 14 holds each of the shaft members 24 in the above inclined posture. In this posture, the respective outer peripheral surfaces 22a of the three planetary rollers 22 are in contact with the outer peripheral surface 4a of the sun roller 4.

In this embodiment, the outer ring 10 is adapted to pressingly move each of the planetary rollers 22 along the corresponding shaft member 24 (adjacent axis L2) so as to generate a traction force between the planetary roller 22 and the sun roller 4. In order to achieve this movement, the outer ring 10 may be simply designed to press each of the planetary rollers 22 from one side thereof in a direction for reducing a distance with respect to the rotation axis L1 of the sun roller 4, when viewed on a corresponding one of the adjacent axes L2. Specifically, when each of the planetary rollers 22 is pressed in this direction, the planetary rollers 22 will be bitten on the sun roller 4 in a constricted arrangement relative to the sun roller 4 according to the inclination of the respective adjacent axes L2, to allow a sufficient traction force to be generated. For this purpose, as shown in FIG. 2, the outer ring 10 is composed of a single outer ring disposed inside the casing 2 and on the back side (on the side of the output shaft 8) relative to the planetary roller 22. The pressing operation of the outer ring 10 for the planetary rollers 22 will be more specifically described below.

Figure 4A:
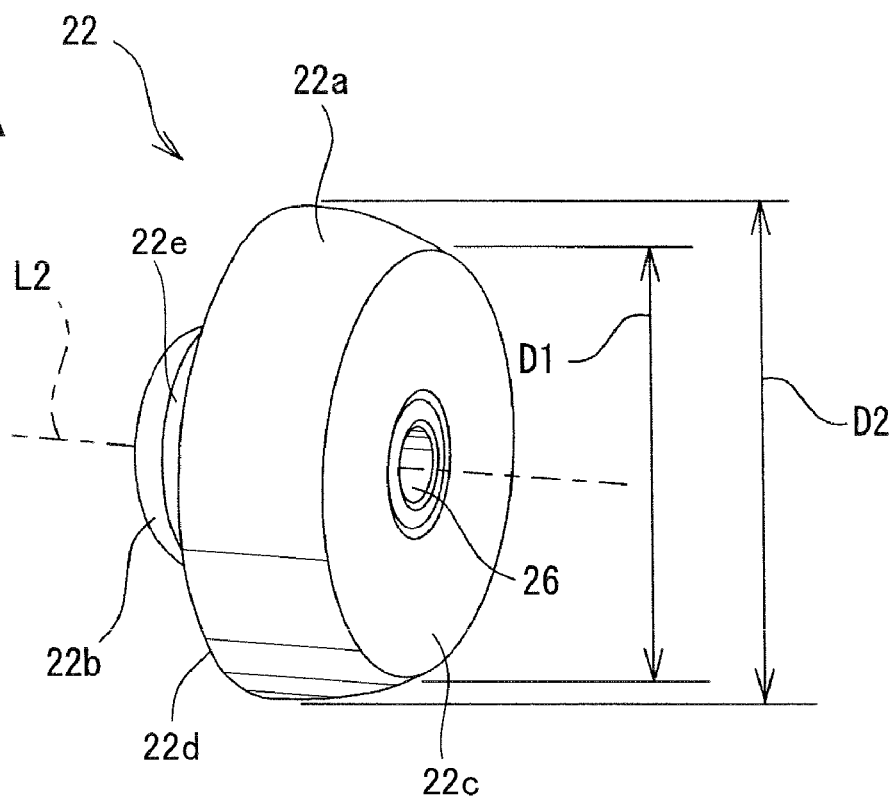
FIGS. 4A and 4B are perspective views showing a detailed configuration of the planetary roller.
Figure 4B:
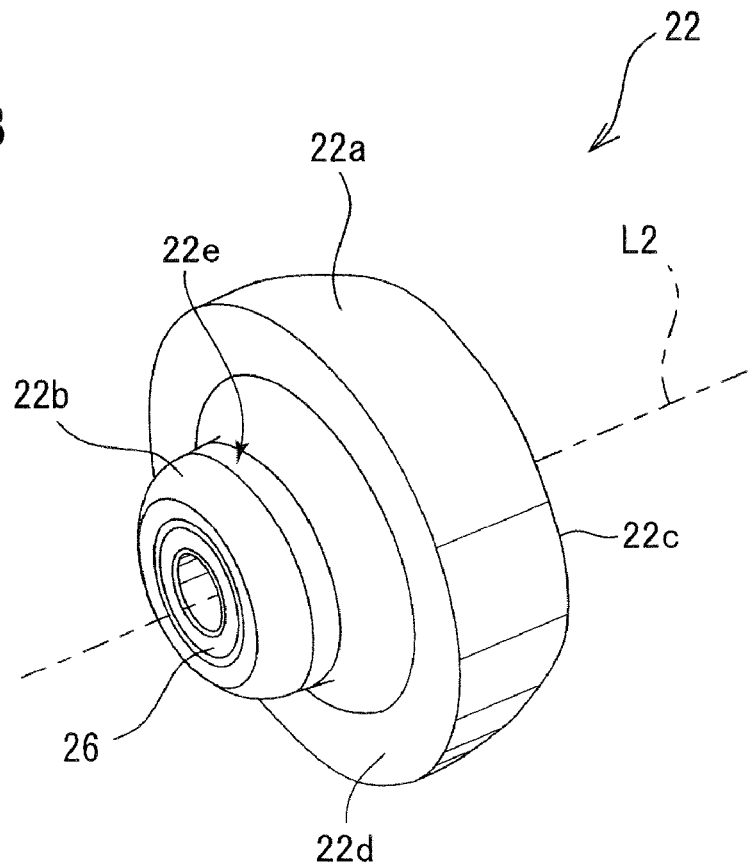

FIGS. 4A and 4B are perspective views showing a detailed configuration of the planetary roller 22. The planetary roller 22 is formed as a generally cylindrical body which has an annular-shaped outer peripheral surface 22a, a pressure-receiving surface 22b, and first and second end surfaces 22c, 22d formed in parallel relation to each other. In a post-assembly state of the traction-drive type driving-force transmission mechanism M, when viewed from the angle as shown in FIG. 4A, the outer ring 10 is located on a back side of the planetary roller 22 (on the side of the second end surface 22d), and the sun roller 4 is located on a front side of the planetary roller 22 (on the side of the first end surface 22c). That is, in the post-assembly state, when viewed from the angle as shown in FIG. 4B, the outer ring 10 is located on a front side of the planetary roller 22 (on the side of the second end surface 22d), and the sun roller 4 is located on an opposite side of the second end surface 22d (on the side of the first end surface 22c). When viewed on the adjacent axis L2, the first end surface 22c is located on the side of the planetary roller 22 closer to the rotation axis L1 of the sun roller 4.

As shown in FIG. 4A, the planetary roller 22 has a shape in which the second end surface 22d has a diameter D2 greater than a diameter D1 of the first end surface 22c. Thus, the outer peripheral surface 22a of the planetary roller 22 has a taper shape depending on a dimensional difference between the diameters D1, D2. This taper shape is determined in accordance with an inclination angle (e.g., 10°) of the rotation axis L2 of the planetary roller 22 relative to the rotation axis L1 of the sun roller 4.

Further, the outer peripheral surface 22a (between the first end surface 22c and the second end surface 22d) is formed in a gently curved shape (gently outwardly curved or rounded shape in section). The curved-shaped outer peripheral surface 22a of the planetary roller 22 provides a structure capable of preventing an edge of the planetary roller 22 from being brought into contact with (i.e., preventing the planetary roller 22 from being brought into edge contact with) the outer peripheral surface 4a of the sun roller 4. In addition, the curved-shaped outer peripheral surface 22a can suppress an influence of an error in inclination of the shaft member 24 supporting the planetary roller 22. Specifically, even if an inclination angle of the shaft member 24 varies within a tolerance (e.g., ±1 degree), the curved-shaped outer peripheral surface 22a can minimize the occurrence of a significant variation in contact state (contact position) thereof relative to the outer peripheral surface 4a of the sun roller 4, which provides approximately-constant traction-drive characteristics.

As shown in FIG. 4B, the planetary roller 22 has a boss portion 22e provided on the side of the second end surface 22d closer to the outer ring 10, and the pressure-receiving surface 22b is formed in an edge region of an outer peripheral surface of the boss portion 22e. This pressure-receiving surface 22b has a taper shape tapered toward the anchor end of the shaft member 24. In this embodiment, the pressure-receiving surface 22b is formed in a gently curved shape (gently outwardly curved or rounded shape in section).

Figure 5:
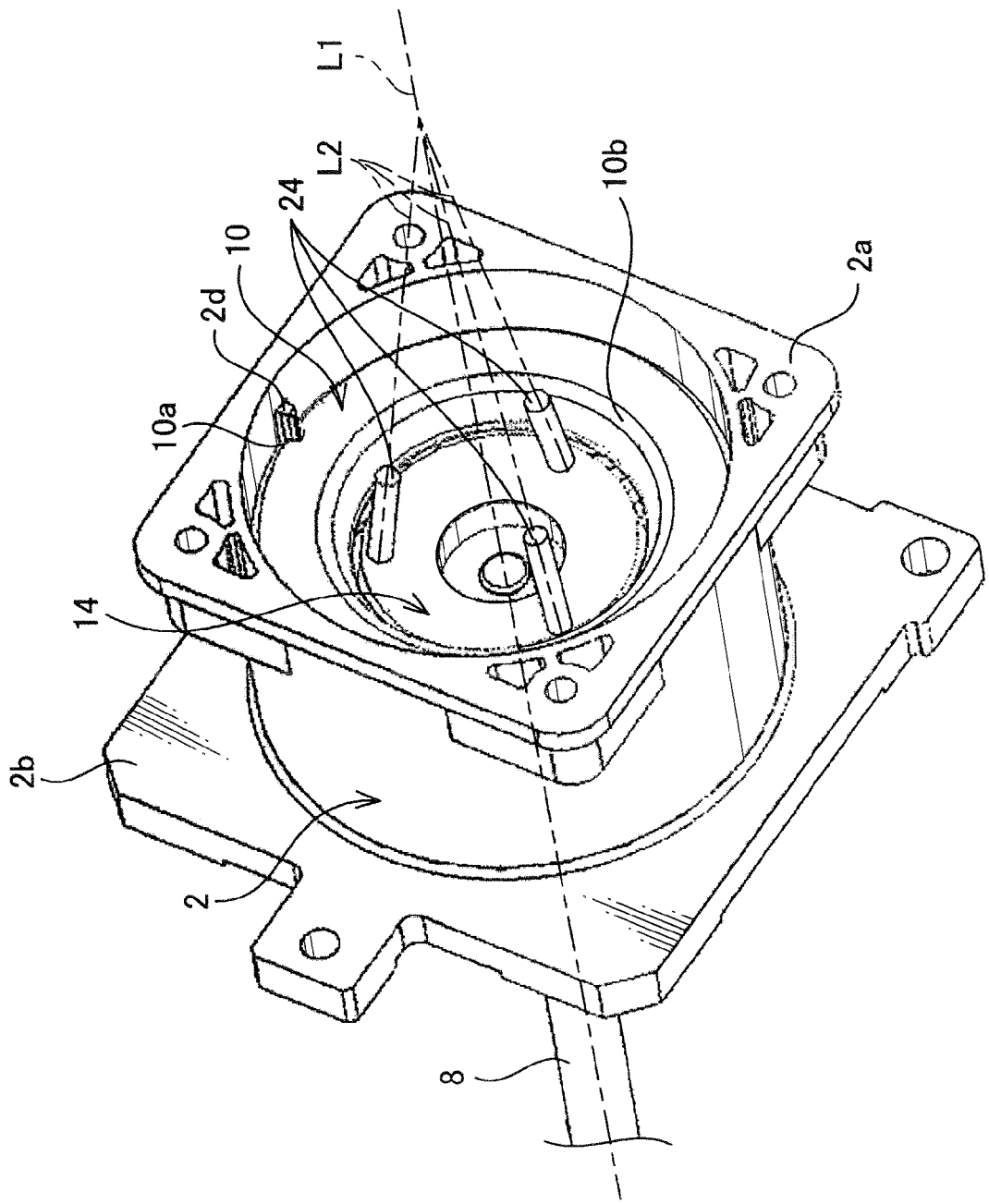
FIG. 5 is a perspective view showing an inside of a casing, wherein the planetary rollers are detached from respective shaft members.

FIG. 5 is a perspective view showing an inside of a casing, wherein the planetary rollers 22 are detached from the respective shaft members 24. The outer ring 10 has a pressing surface 10b formed in one (on the side facing the planetary roller 22) of opposite edge regions of an inner peripheral surface thereof to have a curved shape (outwardly curved or rounded shape in section). In a state after the planetary roller 22 is assembled to the shaft member 24, the pressing surface 10b is in contact with the pressure-receiving surface 22b to give a pressing force to the planetary roller 22.

Figure 6:
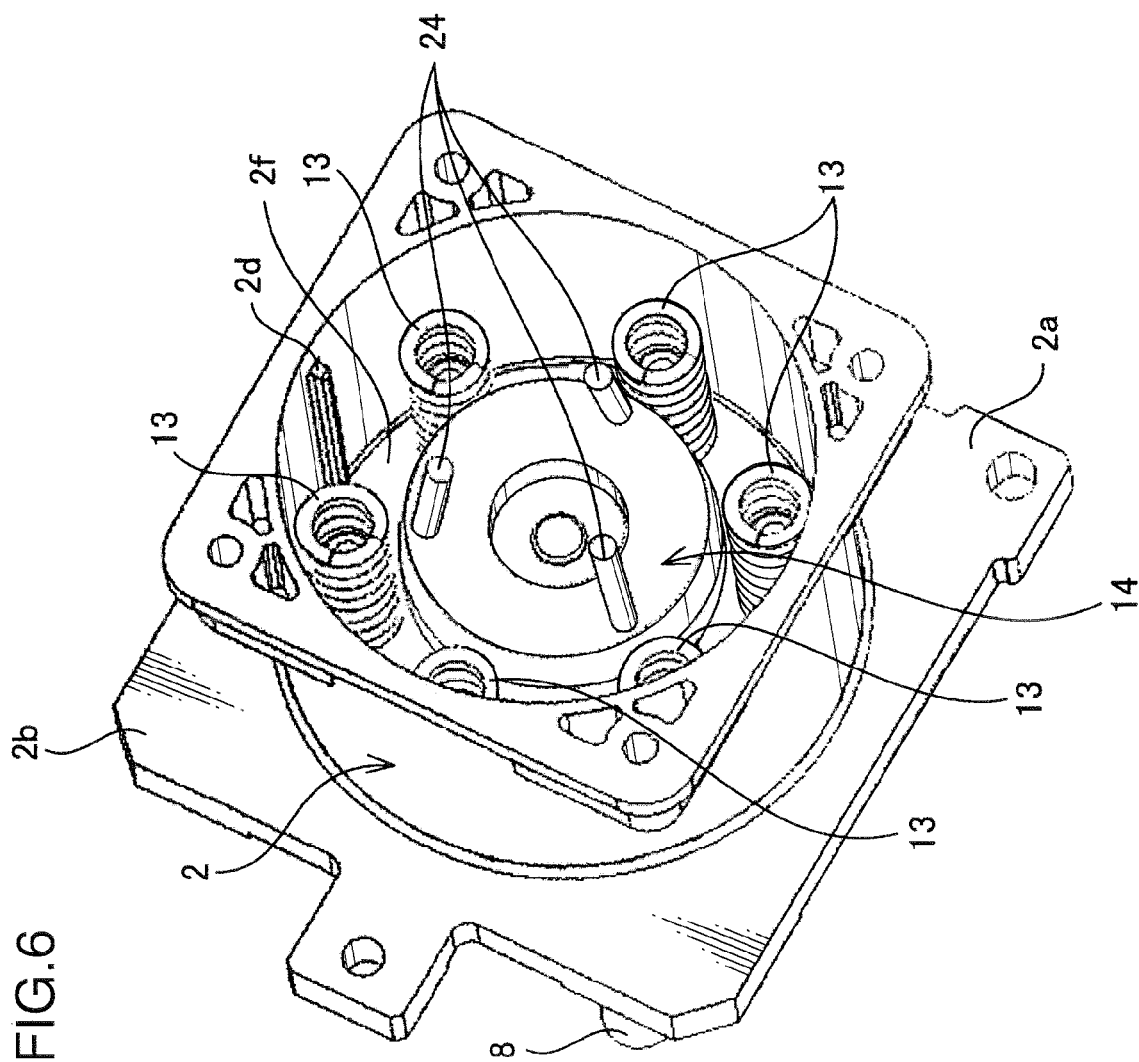
FIG. 6 is a perspective view showing the inside of the casing, wherein the planetary rollers and the outer ring are detached therefrom.

FIG. 6 is a perspective view showing the inside of the casing, wherein the planetary rollers 22 and the outer ring 10 are detached therefrom. The plurality (in this embodiment, six) of compression coil springs 13 (serving as a bias member) are disposed inside the casing 2 at even intervals along an inner peripheral surface of the casing 2. In the post-assembly state of the traction-drive type driving-force transmission mechanism M, each of the compression coil springs 13 is compressed between an internal wall surface 2f of the casing 2 and a lateral surface of the outer ring 10. In this state, the compression coil springs 13 generate a repulsion force (elastic force) to press the outer ring 10 toward the sun roller 4 within the casing 2.

The outer ring 10 receiving the repulsion force of the compression coil springs 13 is biased in a direction coming close to the planetary roller 22. The outer ring 10 is formed with a circular-shaped through-hole which has an inner diameter greater than an outer diameter of the planetary carrier 14. Thus, the outer ring 10 never interferes with the planetary carrier 14.

Each of the planetary rollers 22 is adapted, when the pressing surface 10b of the outer ring 10 is strongly pressed against the pressure-receiving surface 22b of the planetary roller 22, to be infinitesimally moved (i.e., moved by an infinitesimal distance) along the shaft member 24 thereof. Specifically, each of the bearings 26 rotatably supporting a corresponding one of the planetary rollers 22 is assembled to a corresponding one of the shaft members 24 in such a manner as to be displaceable on the corresponding shaft member 24, so that, when a pressing force is given from the outer ring 10 to the corresponding planetary roller 22, the bearing 26 is infinitesimally moved on the corresponding shaft member 24 along the adjacent axis L2 thereof together with the corresponding planetary roller 22. With a view to avoiding the occurrence of a wobbling movement, the bearing 26 is fitted onto the corresponding shaft member 24 with a high degree of accuracy.

Thus, each of the planetary rollers 22 is strongly pressed against the sun roller 4 in a radial direction of the sun roller 4, according to the inclination between the rotation axis L1 of the sun roller 4 and the adjacent axis L2 of the shaft member 24 disposed thereon. In this embodiment, based on this pressing force, an adequate traction force is generated between the outer peripheral surface 4a the sun roller 4 and the outer peripheral surface 22a of each of the planetary rollers 22, in the presence of the lubricant.

An operation of the traction-drive type driving-force transmission mechanism M will be described below. FIG. 7 is a vertical sectional view showing the traction-drive type driving-force transmission mechanism M, taken along an axial direction thereof. As described above, in the post-assembly state of the traction-drive type driving-force transmission mechanism M, the outer ring 10 is pressed toward the sun roller 4 by the repulsion force of the compression coil springs 13. The outer ring 10 evenly presses the respective pressure-receiving surfaces 22b of the three planetary rollers 22 by the pressing surface 10b thereof, and thereby each of the three planetary rollers 22 is slidingly moved slightly along the corresponding shaft member 24 together with the corresponding bearing 26.

Specifically, each of the planetary rollers 22 is infinitesimally moved in a direction for reducing a distance with respect to the rotation axis L1 of the sun roller 4, when viewed on the adjacent axis L2 thereof. Thus, the three planetary rollers 22 are strongly pressed against the sun roller 4 in a direction along which they are constricted (i.e., a distance between respective ones of them is narrowed) toward a central axis (rotation axis L1) of the sun roller 4. Then, when each of the three planetary rollers 22 cannot be further moved, the outer ring 10 is also stopped in its position at this timing.

In this state, an ultrahigh-pressure is developed (in a fine gap) between each of the outer peripheral surfaces 22a of the planetary rollers 22 and the outer peripheral surface 4a of the sun roller 4 in the inside of the casing 2, to allow the grease nipped in the fine gap to exert its elasto-plastic property so as to generate an adequate traction force during rotation of the sun roller 4. Then, when the group of three planetary rollers 22 is moved around the sun roller 4 (i.e., orbited around the outer peripheral surface of the sun roller 4) while being rotated in a direction opposite to that of the sun roller 4 by the traction force, the movement is transmitted to the planetary carrier 14 through each of the shaft members 24. Thus, the entire planetary carrier 14 is rotated in the same direction as that of the sun roller 4. This rotation of the planetary carrier 14 is picked up from the output shaft 8 as an output rotation. This traction-drive type driving-force transmission mechanism M can transmit a torque input into the sun roller 4 to the output shaft 8 at a desired speed reduction ratio with a high degree of accuracy. Thus, the traction-drive type driving-force transmission mechanism M can be used as a speed reducer.

A speed reducer based on the traction-drive type driving-force transmission mechanism M according to this embodiment makes it possible to smoothly transmit a torque without an influence of backlash as in a gear transmission mechanism. Thus, the traction-drive type driving-force transmission mechanism M is suitable as a driving source for an apparatus having a need for controlling a rotational angle with a high degree of accuracy.

In this embodiment, all the planetary rollers 22 are adequately pressed against the sun roller 4 by a pressing force of the single outer ring 10 applied thereto from one direction. Thus, the traction-drive type driving-force transmission mechanism M can be made up using a less number of components.

The inclination angle of each of the shaft members 24 (the adjacent axes L2) relative to the sun roller 4 (rotation axis L1) is not set at an excessively large value (in this embodiment, the inclination angle is set at about 10°), to substantially prevent an influence (e.g., bending moment) of the pressing from occurring in the shaft member 24 itself. This makes it possible to prevent an excessively large radial stress from being applied to the shaft member 24 so as to allow a desired traction-drive effect to be stably obtained using a shaft member having a relatively small diameter.

Each of the bearings 26 is fitted onto the shaft member 24 with a high degree of accuracy to provide a structure where the planetary roller 22 itself is displaceable along the shaft member 24 in only the direction of the rotation axis L2. This makes it possible to prevent the planetary roller 22 itself from inclining (wobbling) relative to the shaft member 24 so as to reliably avoid uneven wear of the sun roller 4 due to an edge contact of the planetary roller 22. Thus, the traction-drive type driving-force transmission mechanism M can maintain adequate durability over a long period of time, so that, when it is applied to an apparatus, such as an image forming apparatus, a function thereof can be continuously exerted until a lifetime limit of the apparatus.

This embodiment has been described based on one example where the shaft members 24 are mounted to the planetary carrier 14 in such a manner that respective distal ends of the shaft members 24 are inclined in a direction along which they are constricted (i.e., a distance between respective ones of them is reduced). Alternatively, the shaft members 24 may be mounted to the planetary carrier 14 in such a manner that the respective distal ends of the shaft members 24 are inclined in a direction along which they are spread outwardly from the respective anchor ends thereof fixed to the planetary carrier 14 (i.e., the distance between respective ones of them is increased). In this case, each of the planetary rollers 22 may be fitted onto a corresponding one of the shaft members 24 while orienting the first and second end surfaces inside out as compared with this embodiment, wherein the outer ring 10 is arranged to press the planetary rollers 22 from the side opposite to that in this embodiment (i.e., from the side of the end plate 6).

[First Modification]

A first modification of the above embodiment will be described, which is provided with a circulation member adapted to forcedly circulate the lubricant (e.g., grease) in the inside of the casing 2.

Figure 8:
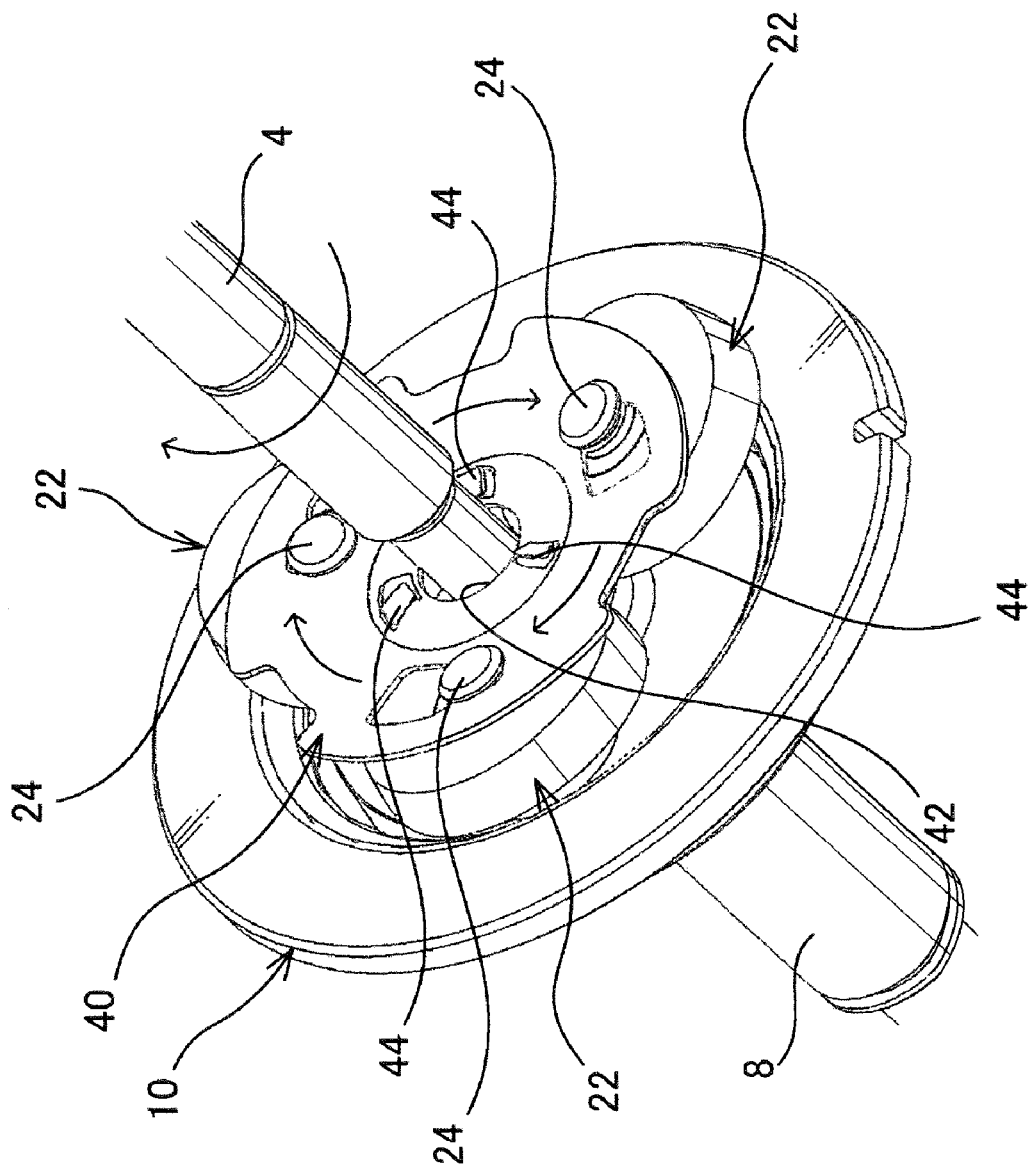
FIG. 8 is a perspective view showing a first modification of the traction-drive type driving-force transmission mechanism, wherein a circulation member is applied thereto.
Figure 9:
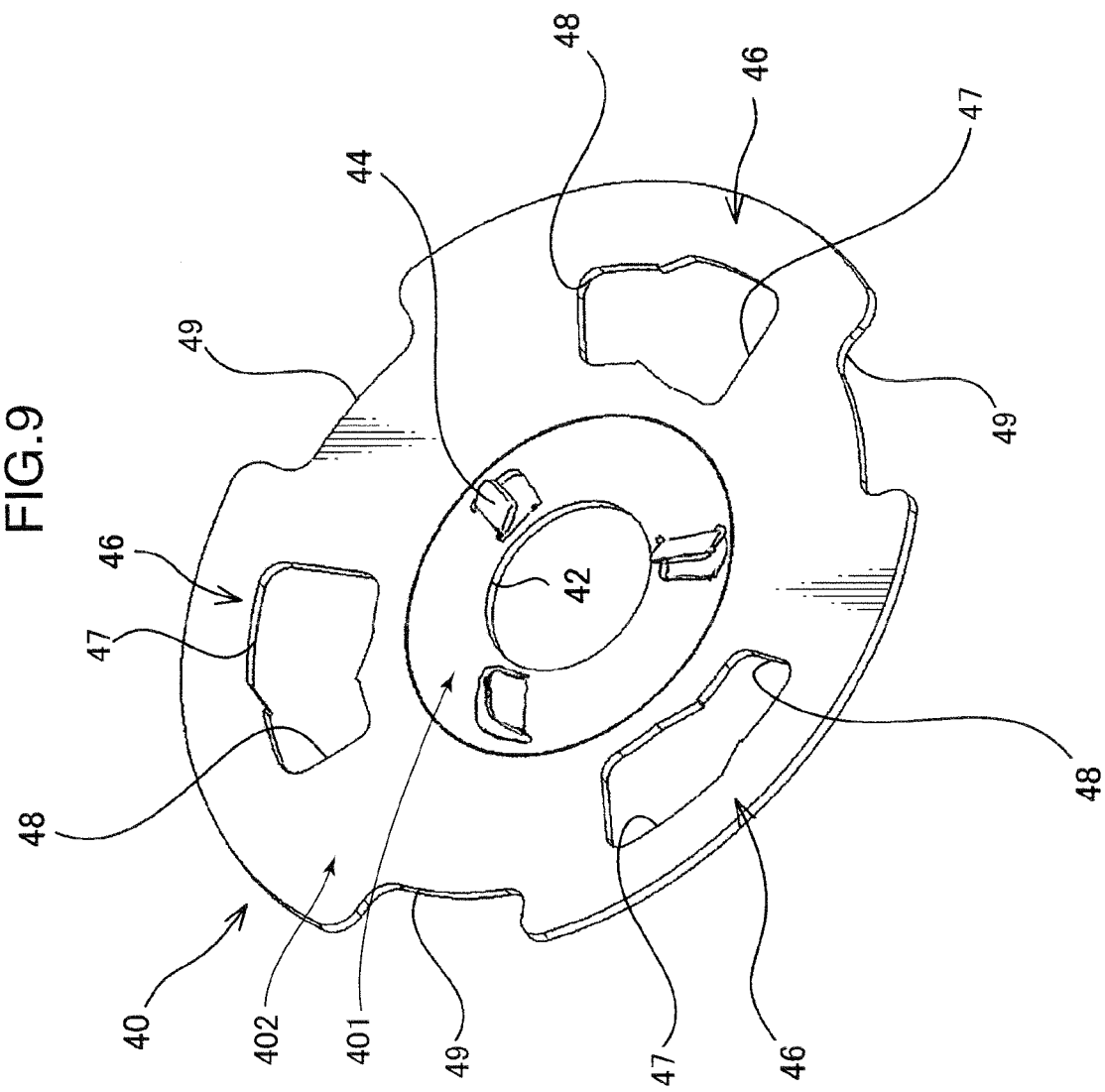
FIG. 9 is a perspective view showing a plate-shaped member having the circulation member in FIG. 8.

FIG. 8 is a perspective view showing the first modification where a support plate 40 as one example of the circulation member is disposed on the side of the first end surface 22c of the planetary roller 22, and FIG. 9 is a perspective view showing the support plate 40 itself. The support plate 40 consists of a generally disk-shaped sheet-metal member which has a hole 42 formed in a central region thereof to allow the sun roller 4 to be inserted thereinto. The support plate 40 further has a three cut-and-bent fins 44 formed at appropriate positions on a radially outward side relative to the hole 42 and arranged at even intervals (at intervals of 120°), and three engagement portions 46 formed at appropriate positions on a radially outward side relative to the cut-and-bent fins 44 and arranged at even intervals (at intervals of 120°). Each of the engagement portions 46 is engaged with a corresponding one of the shaft members 24. Thus, the support plate 40 is rotated about the rotation axis L1 in conjunction with the orbital movement of the group of planetary rollers 22.

The support plate 40 has a flat disk portion 401 extending across the holes 42, and a conical surface portion 402 connected to an outer periphery of the flat disk portion 401 and formed to have an inclination corresponding to the inclination of the shaft members 24. The cut-and-bent fins 44 are formed in the flat disk portion 401, and the engagement portions 46 are formed in the conical surface portion 402.

Each of the cut-and-bent fins 44 is formed by partially cutting the support plate 40 and bending the cut portion toward a base end of the sun roller 4 (i.e., an end of the sun roller 40 on an opposite side of the distal end) to have a given angle relative to the rotation axis L1. Each of the engagement portions 46 includes a narrow region 48 adapted to be engaged with a corresponding one of the shaft members 24 while providing a click feeling as effective as an anti-disengagement function, and a broad region 47 broadened more than the narrowed region 48. The broad region 47 is arranged on a downstream side of the narrow region 48 when viewed in a rotation direction of the sun roller 4. The support plate 40 also has three concave portions 49 formed in an outer peripheral edge thereof at even intervals (i.e., at intervals of 120°).

Figure 10:
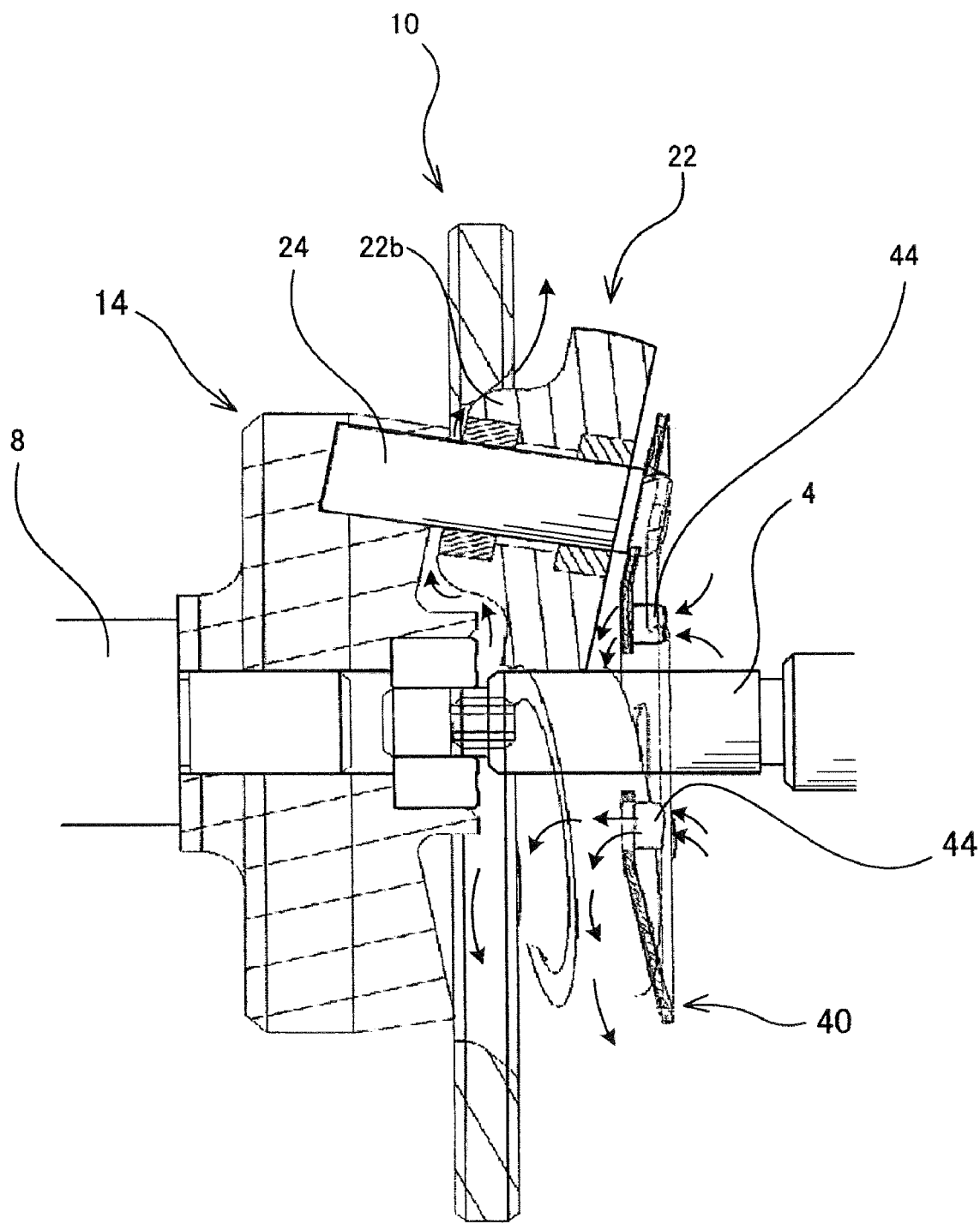
FIG. 10 is an explanatory diagram showing a flow of grease in the traction-drive type driving-force transmission mechanism illustrated in FIG. 8.

The grease in the inside of the casing 2 is forcedly circulated by the fins 44. FIG. 10 is an explanatory diagram showing a flow of the grease generated as a result of installation of the support plate 40. As indicated by the arrows in FIG. 10, the fins 44 are operable, during rotational driving of the planetary carrier 14, to collect the grease residing therearound so as to generate a grease flow along the rotation axis L1 of the sun roller 4, and send the grease toward a press contact portion between the sun roller 4 and each of the planetary rollers 22.

Then, the grease is directed toward the outer ring 10, i.e., a grease flow along the radial direction of the sun roller 4 is generated, because the pressure-receiving surface 22b of each of the planetary rollers 22 has a taper shape tapered toward the anchor end of the shaft member 24, as described above. Thus, the grease is also directed toward a press contact portion between the outer ring 10 and each of the planetary rollers 22.

In this manner, the grease can be forcedly circulated around substantially all of major functional portions of the sun roller 4, the planetary rollers 22 and the outer ring 10, while effectively preventing degradation of the grease as compared with the traction-drive type driving-force transmission mechanism devoid of the support plate 40. More specifically, the entire grease in the inside of the casing 2 will be gradually degraded in an even manner, instead of a situation where only a part of grease residing around the press contact portions will be degraded relatively rapidly. This makes it possible to obtain a long-lifetime, i.e., highly-durable, traction-drive type driving-force transmission mechanism M.

In addition, the fins 44 are provided in the support plate 40, and the support plate 40 is mounted to the respective shaft members 24 in a free fitting manner, so that a function of the shaft members 24 is not disturbed. The support plate 40 having the fins 44 may be provided to the sun roller 4 or the outer ring 10. In this case, the function of forcedly circulating the grease can also be obtained.

[Second Modification]

A second modification of the above embodiment will be described, which has a desired configuration for pressing the planetary rollers 22 by the outer ring 10.

Figure 11:
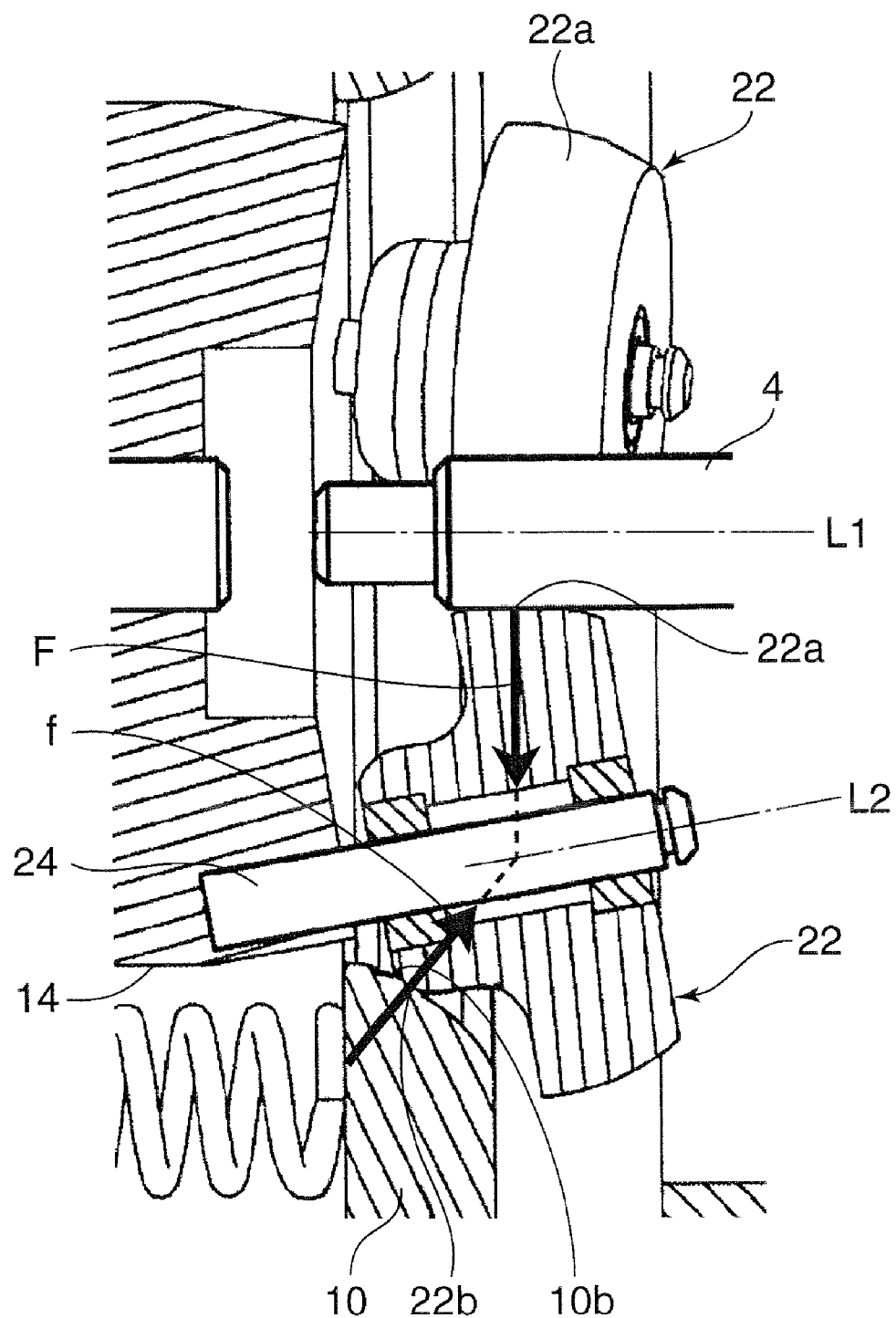
FIG. 11 is an explanatory fragmentary diagram showing a second modification of the traction-drive type driving-force transmission mechanism.

FIG. 11 is an enlarged view showing a pressing portion where one of the planetary rollers 22 is pressed by the outer ring 10. As described above, the outer ring 10 is adapted to strongly press the pressing surface 10b thereof against the pressure-receiving surface 22b of each of the planetary rollers 22 so as to infinitesimally move the planetary roller 22 along the shaft member 24 (adjacent axis L2). During this movement, the planetary roller 22 is strongly pressed against the sun roller 4 in the radial direction of the sun roller 4 according to the inclination of the adjacent axis L2 relative to the rotation axis of the sun roller 4. Based on this pressing force, a traction force is generated between the outer peripheral surface 22a of the planetary roller 22 and the outer peripheral surface 4a of the sun roller 4 in the presence of the grease.

In this state, as indicated by the arrows in FIG. 11, a load vector F (serving as a first vector) directing from the outer peripheral surface 4a of the sun roller 4 toward the shaft member 24 is applied to the shaft member 24 in the radial direction of the sun roller 4 (i.e., in a direction perpendicular to the rotation axis L1). On the other hand, a load vector f (serving as a second vector) directing from the pressing surface 10b toward the shaft member 24 is applied to the shaft member 24 in a direction oblique to the rotation axis L1.

If the load vector F and the load vector f do not intersect with each other at a single point within the shaft member 24, a relatively large bending moment will be applied to the shaft member 24, because the adjacent axis L2 aligned with the central axis of the shaft member 24 is inclined relative to the rotation axis L1 by the given angle α. This bending moment exerts a negative effect on a joining strength between the shaft member 24 and the planetary carrier 14 to cause a problem of difficulty in obtaining a long-lifetime traction-drive type driving-force transmission mechanism M.

In the second modification, an intersecting point between the load vector F from the sun roller 4 and the load vector f from the outer ring 10 is set to conform to a single point within the shaft member 24 (see the respective dotted lines extending from the arrow F and the arrow f in FIG. 11). That is, the load vector F and the load vector f intersect with each other on the central axis of the shaft member 24 (i.e., at a gravity center in cross section of the shaft member 24). Thus, a bending moment to be applied to the shaft member 24 is significantly lowered to expand a fatigue resistance limit of the shaft member 24. This makes it possible to obtain a longer-lifetime traction-drive type driving-force transmission mechanism M, and contribute as a more stable speed reducer to improvement in torque transmission efficiency.

Embodiment as Image Forming Apparatus

Figure 12:
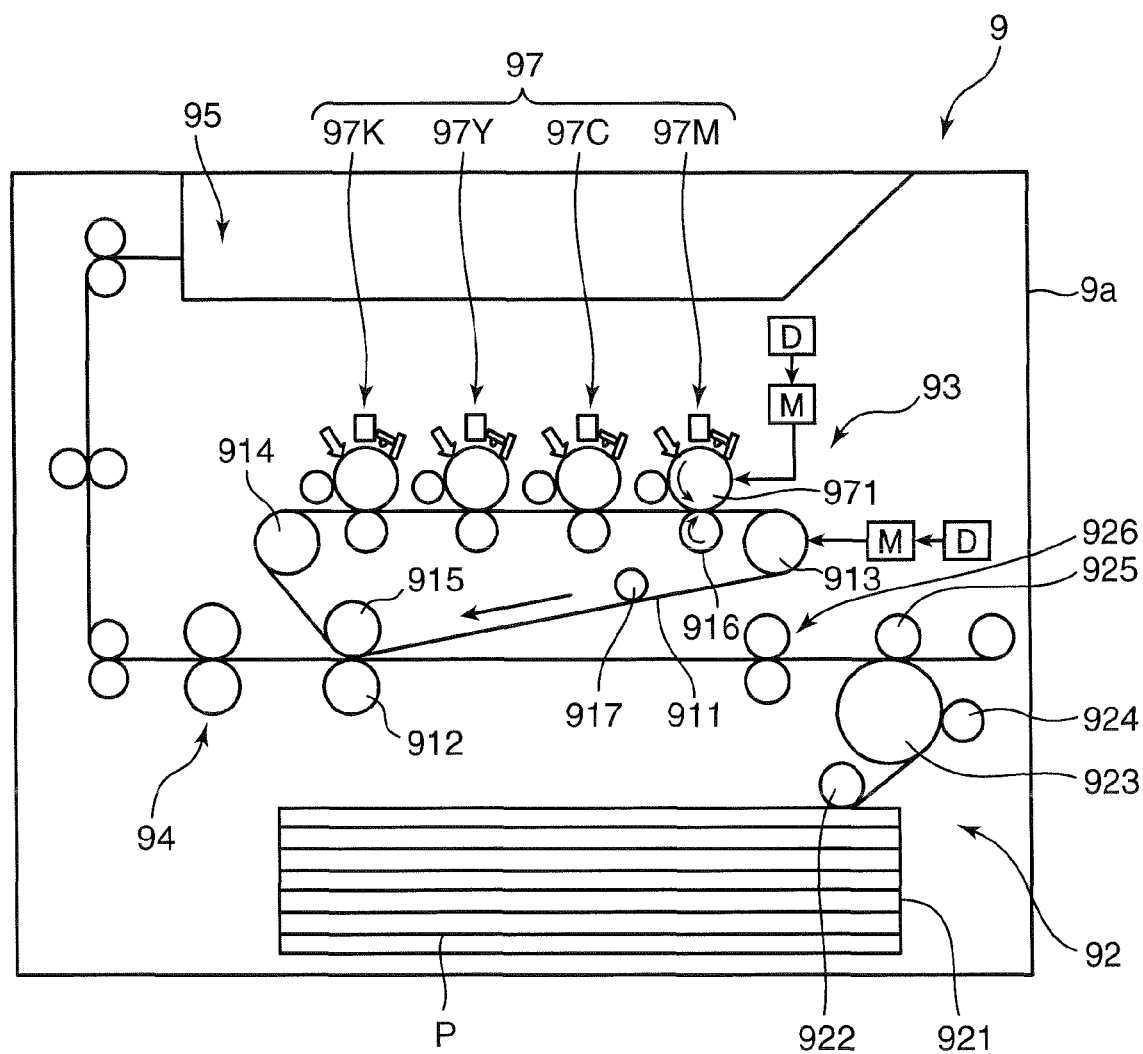
FIG. 12 is a schematic sectional view showing one example of an image forming apparatus according to one embodiment of the present invention.

An apparatus suited to incorporate the above traction-drive type driving-force transmission mechanism M may include a full-color image forming apparatus. FIG. 12 is a schematic sectional view showing a general structure of a tandem-type color printer 9 as one example of a full-color image forming apparatus.

The color printer 9 includes a sheet feed section 92 operable to feed a sheet P, an image forming section 93 operable to transfer an image onto the sheet P while transporting the sheet P fed from the sheet feed section 92, and a fixing section 94 operable to subject the image transferred on the sheet P in the image forming section 93 to a fixing process, which are housed in a box-shaped apparatus body 9a thereof. The apparatus body 9a has an upper surface formed as a catch tray section 95 adapted to receive the sheet P after being subjected to the fixing process in the fixing section 94.

The sheet feed section 92 is provided with a sheet feed cassette 921 adapted to store therein a plurality of sheets P, a pickup roller 922, three sheet feed rollers 923, 924, 925, and a registration roller 926. The image forming section 93 is provided with an image forming unit 97, an intermediate transfer belt 911 adapted to allow a toner image to be primarily transferred onto a surface thereof by the image forming unit 97, and a secondary transfer roller 912 operable to secondarily transfer the toner image on the intermediate transfer belt 911, onto the sheet P sent from the sheet feed cassette 921.

The image forming unit 97 includes a black unit 97K, a yellow unit 97Y, a cyan unit 97C and a magenta unit 97M, which are disposed from an upstream side (left side in FIG. 12) to an downstream side, in this order. Each of the units 97K, 97Y, 97C, 97M has a photosensitive drum 971 disposed at a central position thereof to serve as an image support member. The photosensitive drum 971 is adapted to be drivenly rotated in a counterclockwise direction in FIG. 12. A charger unit, an exposure unit, a developing unit, a cleaning unit and an eraser unit are disposed around the photosensitive drum 971 from an upstream side of a rotation direction of the photosensitive drum 971, in this order.

The intermediate transfer belt 911 comprises an endless belt-shaped rotatable member wound around a drive roller 913, a belt support roller 914, a backup roller 915, four primary transfer rollers 916 and a tension roller 917, in such a manner that an outer surface thereof is kept in contact with outer peripheral surfaces of the respective photosensitive drums 971 of the units 97K, 97Y, 97C, 97M. The intermediate transfer belt 911 is adapted to be endlessly rotated by the plurality of rollers while being pressed against each of the photosensitive drums 971 by a corresponding one of the primary transfer rollers 916 which are disposed in opposed relation to the respective photosensitive drums 971.

Toner images formed on the respective photosensitive drums 971 are sequentially transferred (primarily transferred) onto the intermediate transfer belt 911 circulatingly rotated in the arrowed direction (clockwise direction) according to driving of the drive roller 913, in a superimposed manner, to form a full-color toner image. This full-color toner image is secondarily transferred onto the sheet P in a nip zone defined between the secondary transfer roller 912 and the backup roller 915. The sheet P having the full-color toner image transferred thereon is subjected to the fixing process in the fixing section 94, and then ejected to the catch tray section 95.

In the above color printer 9, the aforementioned traction-drive type driving-force transmission mechanism M may be connected to a driving system for a component to be drivenly rotated. Particularly, the traction-drive type driving-force transmission mechanism M is preferably applied to a driving component for the image forming section 93, such as the photosensitive drum 971 and/or the intermediate transfer belt 911. A rotational driving force of a motor D (serving as a driving source) may be transmitted to a rotary shaft (serving as a driving component) of the photosensitive drum 971 or the drive roller 913 (serving as a driving component) operable to drive the intermediate transfer belt 911, through the traction-drive type driving-force transmission mechanism M. In this case, as compared with gear drive, transmission loss and uneven driving can be suppressed to achieve higher-quality image forming. Further, a stepping motor may be used as the motor. In this case, according to a pulse control of the stepping motor, a rotational angle of the photosensitive drum 971 or the like can be controlled with a high degree of accuracy to achieve significant high-quality image forming.

The above specific embodiments include inventions having the following features.

A traction-drive type driving-force transmission mechanism according to one aspect of the present invention comprises: a sun roller having a first central axis, wherein the sun roller is rotatable about the first central axis; a plurality of shaft members each having a second central axis, wherein each of the shaft members is disposed on an adjacent axis inclined relative to the first central axis by a given angle, in such a manner that the second central axis is aligned with the adjacent axis; a plurality of planetary rollers disposed along an outer peripheral surface of the sun roller while being supported by respective ones of the shaft members; a carrier which holds each of the shaft members in the inclined posture, wherein the carrier is adapted to be rotated about the first central axis together with the planetary rollers; and a pressing member adapted to pressingly move each of the planetary rollers in a direction for reducing a distance with respect to the first central axis when viewed on the adjacent axis, so as to press each of the planetary rollers against the outer peripheral surface of the sun roller to allow a driving force to be transmitted through means of a traction force between the sun roller and each of the planetary rollers.

In the traction-drive type driving-force transmission mechanism of the present invention, each of the planetary rollers is moved on the adjacent axis inclined relative to the first central axis of the sun roller to allow the planetary rollers to be pressed against the sun roller according to the movement. Thus, a traction force can be generated between the sun roller and each of the planetary rollers by simply pressing each of the planetary rollers from only one side thereof. This makes it possible to make up the traction-drive type driving-force transmission mechanism using a less number of components, and facilitate reduction in cost and improvement in component assembling efficiency. In addition, the planetary roller is simply moved on the adjacent axis along the shaft member, without a displacement of a rotation axis of the planetary roller relative to the shaft member (adjacent axes) at any time. This makes it possible to stably maintain the planetary roller in a desired posture so as to reliably prevent so-called "edge contact".

Preferably, in the traction-drive type driving-force transmission mechanism of the present invention, the adjacent axis includes a plurality of adjacent axes intersecting with each other at a single common point on the first central axis, wherein each of the plurality of shaft members is disposed on a respective one of the plurality of adjacent axes. According to this feature, each of the planetary rollers can be pressed against the sun roller under the same condition.

Preferably, in the traction-drive type driving-force transmission mechanism of the present invention, each of the planetary rollers is adapted to be slidably moved on a respective one of the shaft members. For example, it is preferable that the traction-drive type driving-force transmission mechanism of the present invention further comprises a plurality of bearings each supporting a corresponding one of the planetary rollers in a rotatable manner about the shaft member of the corresponding planetary roller, wherein each of the bearings is adapted, when a pressing force is applied from the pressing member to the corresponding planetary roller, to be moved on the shaft member of the corresponding planetary roller along the adjacent axis together with the corresponding planetary roller.

According to this feature, the planetary roller is supported relative to the shaft member through the bearing. This makes it possible to more smoothly rotate the planetary roller, and move the bearing relative to the shaft member together with the planetary roller according to a pressing force from the pressing member, so as to adequately generate the traction force.

More specifically, it is preferable that the above traction-drive type driving-force transmission mechanism further comprises a bias member biasing the pressing member in a direction coming close to each of the planetary rollers, wherein: the pressing member has a pressing surface adapted to press each of the planetary rollers toward the sun roller; and each of the planetary rollers has a pressure-receiving surface adapted to be pressed by the pressing surface, and wherein each of the planetary rollers is adapted, when the pressure-receiving surface is pressed by the pressing surface of the biased pressing member, to be infinitesimally moved on the shaft member thereof. According to this feature, the traction force can be stably generated.

Preferably, in the traction-drive type driving-force transmission mechanism of the present invention, each of three components consisting of the sun roller, the planetary roller and the pressing member to be brought into press contact with each other is made of a material having a hardness set to become higher in descending order of surface velocity in respective press contact portions of the components. According to this feature, as compared with a case where the three components are made of the same material, performance deterioration due to seizing or wearing can be suppressed to provide a long-lifetime traction-drive type driving-force transmission mechanism.

Preferably, in the traction-drive type driving-force transmission mechanism of the present invention, each of three components consisting of the sun roller, the planetary roller and the pressing member to be brought into press contact with each other is made of a material having a hardness equal to or greater than that of at least die steel, and at least one of the components to be driven at a maximum value of surface velocity in respective press contact portions thereof has a surface subjected to a micro-shot peening treatment. According to this feature, as compared with a case where the component is not subjected to the micro-shot peening treatment, performance deterioration due to wearing can be suppressed to provide a long-lifetime traction-drive type driving-force transmission mechanism.

Preferably, the traction-drive type driving-force transmission mechanism of the present invention further comprises a casing receiving therein the planetary rollers, the pressing member and a part of the sun roller, while being filled with a lubricant, and a circulation member disposed inside the casing, and adapted to forcedly circulate the lubricant. According to this feature, the lubricant is positively circulated toward the components in press contact with each other, by the circulation member. This makes it possible to prevent degradation of the lubricant so as to provide extended lifetime to the traction-drive type driving-force transmission mechanism.

Preferably, the traction-drive type driving-force transmission mechanism of the present invention further comprises an output shaft connected to the carrier in such a manner as to be drivingly rotated by the carrier, wherein the output shaft is screwed with the carrier in a direction allowing the output shaft to be tightened in a driven state thereof. According to this feature, the output shaft is screwed with the guide member in the direction allowing the output shaft to be tightened in a driven state thereof. This makes it possible to reliably maintain the connection between the guide member and the output shaft.

Preferably, in the traction-drive type driving-force transmission mechanism of the present invention, each of the planetary rollers has a shape in which a second end surface on the side thereof farther from the first central axis has a diameter greater than that of a first end surface on the side thereof closer to the first central axis, when viewed on the adjacent axis. According to this feature, the planetary roller can be formed to have an adequate outer peripheral surface depending on the inclination of the adjacent axis.

In this case, it is particularly preferable that each of the planetary rollers has an outer peripheral surface located between the first and second end surfaces and formed as a gently curved surface. The curved-shaped outer peripheral surface can suppress an influence of an error in inclination of the shaft member supporting the planetary roller. Specifically, even if an inclination angle of the shaft member varies within a tolerance (e.g., ±1 degree), the curved-shaped outer peripheral surface can minimize the occurrence of a significant variation in contact state (contact position) thereof relative to the outer peripheral surface of the sun roller, which provides approximately-constant traction-drive characteristics.

Preferably, in the traction-drive type driving-force transmission mechanism of the present invention, the pressing member has a pressing surface adapted to press each of the planetary rollers toward the sun roller in such a manner that a first load vector directing from the pressing surface toward any one of the shaft members, and a second load vector directing from the outer peripheral surface of the sun roller toward the one shaft member, intersect with each other at a single point within the one shaft member. In this case, it is particularly preferable that the first and second load vectors intersect with each other on the second central axis of the one shaft member.

According to this feature, a bending moment to be applied to the shaft member can be minimized to extend a usable life of the shaft member.

The above traction-drive type driving-force transmission mechanism makes it possible to accurately manage a state when the planetary rollers are pressed against the sun roller (i.e., pressing state) so as to prevent uneven wear or the like in each of the components to allow each of the components to adequately exert a function thereof until the end of its original lifetime.

An image forming apparatus according to another aspect of the present invention comprises: an image forming section including at least a photosensitive drum, or a photosensitive drum and an intermediate transfer belt; a driving source operable to generate a driving force for driving the photosensitive drum, or at least one of the photosensitive drum and the intermediate transfer belt; and a traction-drive type driving-force transmission mechanism operable to transmit the driving force of the driving source to a rotary shaft of the photosensitive drum, or a driving member of the intermediate transfer belt, wherein the traction-drive type driving-force transmission mechanism includes: a sun roller having a first central axis, wherein the sun roller is rotatable about the first central axis; a plurality of shaft members each having a second central axis, wherein each of the shaft members is disposed on an adjacent axis inclined relative to the first central axis by a given angle, in such a manner that the second central axis is aligned with the adjacent axis; a plurality of planetary rollers disposed along an outer peripheral surface of the sun roller while being supported by respective ones of the shaft members; a carrier which holds each of the shaft members in the inclined posture, wherein the carrier is adapted to be rotated about the first central axis together with the planetary rollers; and a pressing member adapted to pressingly move each of the planetary rollers in a direction for reducing a distance with respect to the first central axis when viewed on the adjacent axis, so as to press each of the planetary rollers against the outer peripheral surface of the sun roller to allow a driving force to be transmitted through means of a traction force between the sun roller and each of the planetary rollers.

In the image forming apparatus of the present invention, the traction-drive type driving-force transmission mechanism is connected to a driving system of the photosensitive drum and/or the intermediate transfer belt. This makes it possible to rotationally control the photosensitive drum and/or the intermediate transfer belt with a higher degree of accuracy as compared with gear drive, so as to achieve higher-quality image forming.

This application is based on patent application Nos. 2007-168403, 2007-294296, 2007-294298, 2007-294299, 2007-294300, and 2007-294301 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. A traction-drive type driving-force transmission mechanism comprising:
   a sun roller having a first central axis, said sun roller being rotatable about said first central axis;
   a plurality of shaft members each having a second central axis, each of said shaft members being disposed on an adjacent axis inclined relative to said first central axis by a given angle, in such a manner that said second central axis is aligned with said adjacent axis;
   a plurality of planetary rollers disposed along an outer peripheral surface of said sun roller while being supported by respective ones of said shaft members;
   a carrier which holds each of said shaft members in said inclined posture, said carrier being adapted to be rotated about said first central axis together with said planetary rollers; and
   a pressing member adapted to pressingly move each of said planetary rollers in a direction for reducing a distance with respect to said first central axis when viewed on said adjacent axis, so as to press each of said planetary rollers against said outer peripheral surface of said sun roller to allow a driving force to be transmitted through means of a traction force between said sun roller and each of said planetary rollers.

2. The traction-drive type driving-force transmission mechanism as defined in claim 1, wherein said adjacent axis includes a plurality of adjacent axes intersecting with each other at a single common point on said first central axis, wherein each of said plurality of shaft members is disposed on a respective one of said plurality of adjacent axes.

3. The traction-drive type driving-force transmission mechanism as defined in claim 1, wherein each of said planetary rollers is adapted to be slidably moved on a respective one of said shaft members.

4. The traction-drive type driving-force transmission mechanism as defined in claim 1, which further comprises a plurality of bearings each supporting a corresponding one of said planetary rollers in a rotatable manner about said shaft member of said corresponding planetary roller, each of said bearings being adapted, when a pressing force is applied from said pressing member to said corresponding planetary roller, to be moved on said shaft member of said corresponding planetary roller along said adjacent axis together with said corresponding planetary roller.

5. The traction-drive type driving-force transmission mechanism as defined in claim 4, which further comprises a bias member biasing said pressing member in a direction coming close to each of said planetary rollers, wherein:
said pressing member has a pressing surface adapted to press each of said planetary rollers toward said sun roller; and
each of said planetary rollers has a pressure-receiving surface adapted to be pressed by said pressing surface, each of said planetary rollers being adapted, when said pressure-receiving surface is pressed by said pressing surface of said biased pressing member, to be infinitesimally moved on said shaft member thereof.

6. The traction-drive type driving-force transmission mechanism as defined in claim 1, wherein each of three components consisting of said sun roller, said planetary roller and said pressing member to be brought into press contact with each other is made of a material having a hardness set to become higher in descending order of surface velocity in respective press contact portions of said components.

7. The traction-drive type driving-force transmission mechanism as defined in claim 1, wherein each of three components consisting of said sun roller, said planetary roller and said pressing member to be brought into press contact with each other is made of a material having a hardness equal to or greater than that of at least die steel, and at least one of said components to be driven at a maximum value of surface velocity in respective press contact portions thereof has a surface subjected to a micro-shot peening treatment.

8. The traction-drive type driving-force transmission mechanism as defined in claim 1, which further comprises:
a casing receiving therein said planetary rollers, said pressing member and a part of said sun roller, while being filled with a lubricant; and
a circulation member disposed inside said casing, and adapted to forcedly circulate said lubricant.

9. The traction-drive type driving-force transmission mechanism as defined in claim 1, which further comprises an output shaft connected to said carrier in such a manner as to be drivingly rotated by said carrier, said output shaft being screwed with said carrier in a direction allowing said output shaft to be tightened in a driven state thereof.

10. The traction-drive type driving-force transmission mechanism as defined in claim 1, wherein each of said planetary rollers has a shape in which a second end surface on the side thereof farther from said first central axis has a diameter greater than that of a first end surface on the side thereof closer to said first central axis, when viewed on said adjacent axis.

11. The traction-drive type driving-force transmission mechanism as defined in claim 10, wherein each of said planetary rollers has an outer peripheral surface located between said first and second end surfaces and formed as a gently curved surface.

12. The traction-drive type driving-force transmission mechanism as defined in claim 1, wherein said pressing member has a pressing surface adapted to press each of said planetary rollers toward said sun roller in such a manner that a first load vector directing from said pressing surface toward any one of said shaft members, and a second load vector directing from said outer peripheral surface of said sun roller toward said one shaft member, intersect with each other at a single point within said one shaft member.

13. The traction-drive type driving-force transmission mechanism as defined in claim 12, wherein said first and second load vectors intersect with each other on said second central axis of said one shaft member.

14. An image forming apparatus comprising:
an image forming section including at least a photosensitive drum, or a photosensitive drum and an intermediate transfer belt;
a driving source operable to generate a driving force for driving said photosensitive drum, or at least one of said photosensitive drum and said intermediate transfer belt; and
a traction-drive type driving-force transmission mechanism operable to transmit the driving force of said driving source to a rotary shaft of said photosensitive drum, or a driving member of said intermediate transfer belt, said traction-drive type driving-force transmission mechanism including:
a sun roller having a first central axis, said sun roller being rotatable about said first central axis;
a plurality of shaft members each having a second central axis, each of said shaft members being disposed on an adjacent axis inclined relative to said first central axis by a given angle, in such a manner that said second central axis is aligned with said adjacent axis;
a plurality of planetary rollers disposed along an outer peripheral surface of said sun roller while being supported by respective ones of said shaft members;
a carrier which holds each of said shaft members in said inclined posture, said carrier being adapted to be rotated about said first central axis together with said planetary rollers; and
a pressing member adapted to pressingly move each of said planetary rollers in a direction for reducing a distance with respect to said first central axis when viewed on said adjacent axis, so as to press each of said planetary rollers against said outer peripheral surface of said sun roller to allow a driving force to be transmitted through means of a traction force between said sun roller and each of said planetary rollers.

* * * * *